(12) United States Patent
Bates et al.

(10) Patent No.: US 6,619,158 B2
(45) Date of Patent: Sep. 16, 2003

(54) PLIER TOOL AND METHOD

(75) Inventors: Darryle E. Bates, Cuyahoga Falls, OH (US); Leonard R. Murg, Eastlake, OH (US)

(73) Assignee: Stride Tool, Inc., Ellicottville, NY (US)

( * ) Notice: Subject to any disclaimer, the term of this patent is extended or adjusted under 35 U.S.C. 154(b) by 0 days.

(21) Appl. No.: 09/880,593

(22) Filed: Jun. 13, 2001

(65) Prior Publication Data

US 2002/0189020 A1 Dec. 19, 2002

(51) Int. Cl.[7] .............................. H02G 1/12; B25F 1/00
(52) U.S. Cl. ................. 81/9.4; 7/107; 30/90.1
(58) Field of Search .......................... 7/107, 131, 134; 81/9.4, 9.44; 30/90.1, 90.2, 194, 351–357, 287

(56) References Cited

U.S. PATENT DOCUMENTS

| | | | |
|---|---|---|---|
| 838,706 A | * 12/1906 | Fuller | 81/9.4 |
| 1,814,589 A | 7/1931 | Endsley | |
| 2,668,464 A | 2/1954 | Paules | |
| 3,777,323 A | 12/1973 | Ingram | |
| 3,871,078 A | 3/1975 | Ogle | |
| 3,947,905 A | 4/1976 | Neff | |
| 4,229,849 A | 10/1980 | Theiler, Sr. | |
| 4,607,544 A | 8/1986 | Jewell, Jr. | |
| 4,625,596 A | 12/1986 | Makus | |
| 4,985,996 A | 1/1991 | Steiner | |
| 5,711,182 A | 1/1998 | Yang | |
| 5,724,688 A | 3/1998 | Chen | |
| 5,894,617 A | 4/1999 | Liou | |
| 6,012,357 A | 1/2000 | John | |

* cited by examiner

*Primary Examiner*—D. S. Meislin
(74) *Attorney, Agent, or Firm*—Watts Hoffmann Co., L.P.A.

(57) ABSTRACT

A cable cutting and stripping tool is disclosed. The tool has a pair of pivotally connected levers relatively moveable between open and closed positions. Each lever includes a handle portion and a jaw portion disposed on opposite sides of the pivot. The levers have coacting cable severing blades adapted to sever a cable in a shearing action. The levers further include a pair of coacting shield insulation cutting and stripping cutters. The levers also include a coacting pair of sheath and conductor insulation cutting and stripping cutters. A process of preparing a coaxial cable for attachment of a connector is also disclosed.

10 Claims, 1 Drawing Sheet

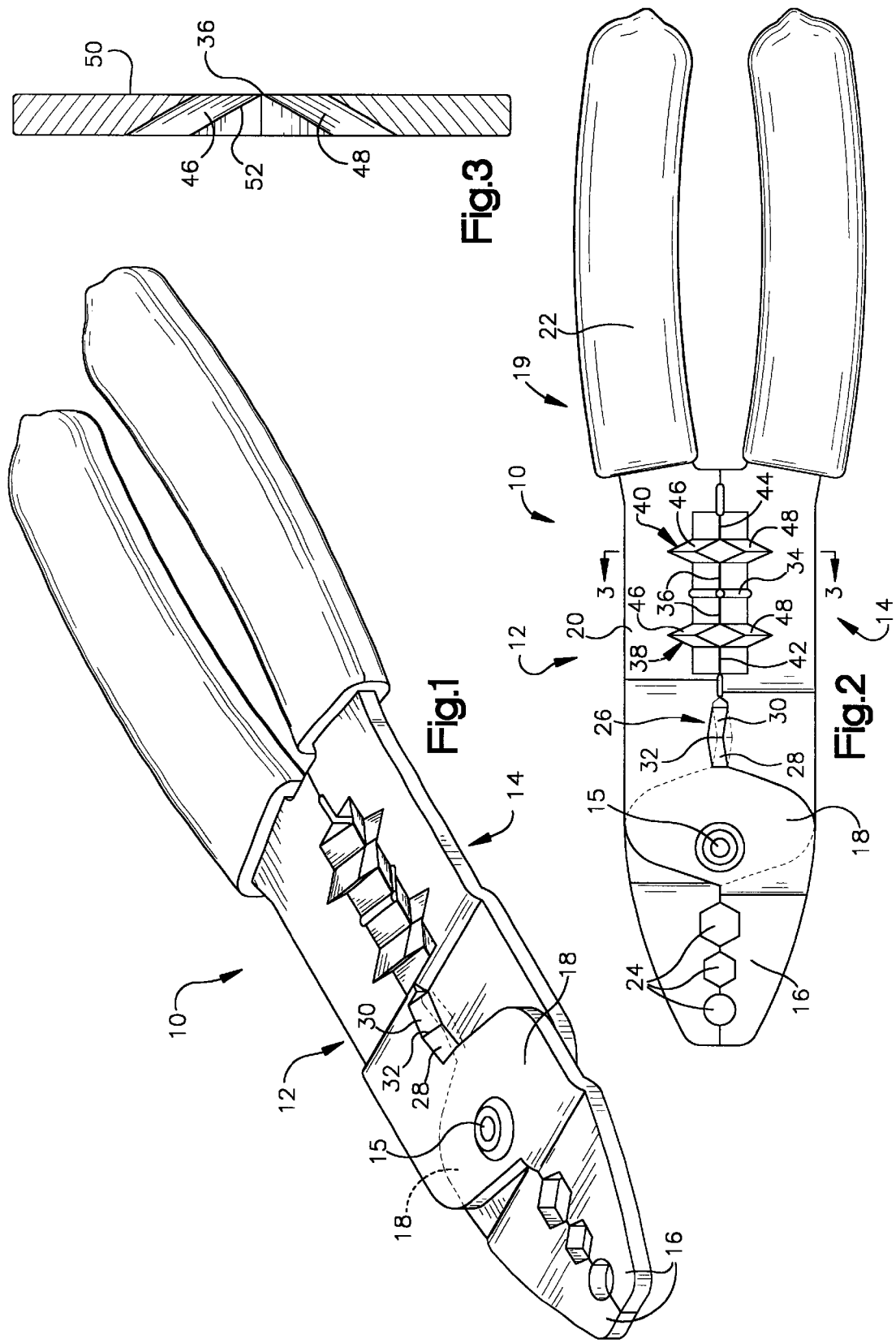

PLIER TOOL AND METHOD

TECHNICAL FIELD

This invention relates to plier tools and more particularly to a novel and improved tool for preparation of a coaxial cable to form a connection.

BACKGROUND OF THE INVENTION

Plier tools especially suited for preparation of insulated electrical conductors for connection are now well known. Such tools are often referred to as "wire strippers", although they typically include structure for crimping connectors into electrical contact with such conductors.

Coaxial cables are now widely used for cable television and other applications. Such a cable includes a central, axially disposed conductor surrounded by a coaxially disposed shield. The shield and conductor are separated by insulating material and further insulation surrounds the shield. The shield is typically an elongated braided wire tube.

When a coaxial cable is to be connected, it is necessary to strip both layers of insulation and a portion of the shield from around the central axial conductor. A further piece of the external or shield insulation is removed from around the shield to expose an end part of the shield. The reason for exposing the end part of the shield is to enable it to be grounded.

Once the insulation has been stripped from both the conductor and the shield, a suitable connector is secured to the conductor and the shield. Typically, the connector is connected to the conductor by crimping a metal sleeve forming a part of the connector into electrically conductive relationship with the conductor. Usually the connector is also in electrically conductive relationship with the shield in order to ground the shield.

Existing tools for cutting and stripping coaxial cable and securing appropriate connectors to them, have exhibited a number of shortcomings. As a first step in preparing a cable for use, a cable piece of desired length is cut from a supply which is typically a coil. Thus, an end piece of a cable is cut off in a manner which provides a good clean starting condition. Prior tools, when new, have been effective to perform such preparatory trimming, but with currently available cable, the blades for such end trimming quickly become nicked. They become nicked because coaxial cable manufacturers, in order to reduce costs, utilize copper coated steel conductors rather than solid copper. The result is greatly shortened useful life of the tools.

After an end of a cable has been cut to provide a clean starting condition, small end parts of both layers of insulation and the shield are removed. Thereafter a further small end part of the remaining shield insulation is cut and stripped to expose an end section of the shield.

With coaxial cable stripping tools, such cutting and stripping has heretofore been performed with cutters having coacting blades that effect shear cuts. A tool effecting such shearing is not fully satisfactory because it tends to cock when effecting a cut for stripping. Cocking results in a cut which is not normal to the axis of the cable.

Expressed another way if a prior stripping tool and the work piece are held rigidly as a shear cut of insulation around the wire or a shear cut of insulation around the coaxial shield is performed, the respective outer surfaces of the blades flare from their cutting edges outwardly so that. These flared outer surfaces effect a camming action against the insulating material which causes a cable to bend as the shearing action occurs. More importantly, as a stripping action occurs a leading tapered surface acting against the insulation being stripped applies a force which has components which has both axial of the cable and normal to it This force tends to apply a bending moment to the cable and more importantly to result in a scraping force against the cable shield or wire depending on which layer is being stripped. Considerable damage can be done by the blade, due to this bending moment, resulting in a scraping the coaxial shield or the cable central conductor as the case may be. In addition there is a tendency for the tool to strip improperly so that braids in the coaxial cable, for example, are pulled with the insulation. In short, shear action stripping tools do not work at all well on coaxial cable.

A further shortcoming is, because of tolerances in both the cable and the stripping tool, even the most skilled technician is apt to find that either the cutter did not fully shear insulation to be stripped, or that, where stripping is of insulation around the shield, the shield is hit by the cutters and damaged.

Accordingly, it would be desirable to provide a novel and improved coaxial cable preparation tool which overcomes the described shortcomings and others.

SUMMARY OF THE INVENTION

A plier tool made in accordance with the present invention has a pair of pivotally connected levers. Each lever includes jaw, boss and handle portions with the jaw and handle portions on opposite sides of the boss portion and the pivot. The jaw portions include connector crimping recesses for crimping standard size connectors onto coaxial cable conductors.

A pair of coacting cable shearing blades are positioned in the boss portions between the handle portions and the pivot and near the pivot. Each of these blades is unique in that it is comprised of a pair of blade sections that are connected at a juncture and that are at an obtuse angle with respect to one another. When the levers are moved from an open to a closed position to effect a cable trimming operation, these blade sections cam the central conductor to the juncture so that nicking caused by a copper clad steel conductors is confined to the junctures. This confining of the nicking assures good long blade life for cutting all of the cable other than the central conductor.

Each lever has a stripping section. Each stripping section includes a semicircular blade part and straight blade sections extending from either side of the semicircular part. On closing on a coaxial cable, the straight sections cut through surrounding insulation and the shield as do the semicircular parts until the straight parts abut and the semicircular parts define a circle surrounding the axial conductor. After the tool has reached its closed position, the cable and tool are relatively moved axially to strip the severed end parts of shield and insulation from the conductor.

Two pairs of sheath insulation cutters are provided to accommodate two standard sizes of coaxial cable. Each of the sheath insulation cutters includes a V-shaped section such that when the handles are in the closed position, the V-shaped sections of a pair define a diamond shaped opening.

The sheath insulation cutter pairs are disposed on opposite sides of the semicircular parts such that the straight sections extend from the semicircular parts to the sheath cutters. Further straight sections are on opposite sides of the sheath stripping sections such that the straight sections cooperate in the sheath stripping. The straight sections are in abutment when the tool is in the closed position such that cutting is effected by a nipping, as distinguished from a shearing action.

In stripping sheath insulation from a sheath, a cable to be stripped is inserted into a space between the appropriate one of the pairs of sheath cutters. The tool is closed until the V-shaped blades establish four points of contact with sheath insulation. The four points are disposed in an imaginary plane normal to the axis of the cable. As the handles are further closed, the V-shaped blades cut into the sheath insulation until they substantially contact the sheath at four spaced points. The tool and cable are then relatively rotated to sever the insulation fully and circumferentially. Typically, the relative rotation is accomplished either by spinning the tool around the cable or oscillating the tool until a full cut normal to the axis of the cable is accomplished. The cable and tool are then relatively moved axially to strip a cut part of sheath insulation from the cable. The cable is now in condition for crimp connection of a suitable connector.

The nipping cutting action for preparing the cable for both stripping the insulation and shield from the axial wire and stripping the shield insulation totally overcomes the problem with the prior art shearing tools. The problems are overcome because forces applied during this cutting action are circumferentially uniform and normal to the axis of the cable being stripped and the stripping action applies forces circumferentially and axially total avoiding the camming and bending action of prior shearing type tools. Since the camming or bending action is avoided stripping is clean without damaged to either the coaxial shield or the axial conductor.

Accordingly, the objects of the invention are to provide a novel and improved cable preparation tool and a method of preparing a cable for use.

BRIEF DESCRIPTION OF DRAWINGS

FIG. 1 is a perspective view of the plier tool of the present invention;

FIG. 2 is a plan view of the tool; and

FIG. 3 is a sectional view of the tool as seen from the plane indicated by the line 3—3 of FIG. 2.

BEST MODE AND PREFERRED EMBODIMENT FOR CARRYING OUT THE INVENTION

Referring to the drawings and FIGS. 1 and 2 in particular, the plier tool of the present invention is shown generally at 10. The tool includes a pair of levers 12, 14 joined together by a pivot 15. Each of the levers includes a jaw portion 16 and a boss portion 18. As will be apparent from the drawings, the boss portions are the portions connected by the pivot 15. Each lever also includes a handle portion 19 comprised of a stripping part 20 and a gripping part 22. The jaw and handle portions are each offset from their connected boss portions such that they are symmetrical about a common plane. The boss portions are in abutment in the same plane.

The jaw portions as disclosed include three connector crimping apertures 24. Each crimping aperture 24 is sized for crimping of a mating standard size connector. The connector crimping is accomplished by simply moving the levers 12, 14 to their open positions and then returning the levers to the closed position shown in the drawings, while the connector to be crimped is positioned within the appropriate one of the crimping apertures.

A cable cutter 26 is formed in the boss portions 18. The cable cutter 26 is comprised of coacting cutter blades each of which has two blade sections 28, 30. The blade sections 28, 30 of each boss portion are straight sections at an obtuse angle with respect to one another. The sections 28, 30 meet at junctures 32.

The cutters 26 overlap one another to effect a shearing action when in an end piece of a cable is cut off. As will be seen from an examination of FIG. 2, the sections defining the obtuse angles are oriented such that when the tool is in its closed position, spaced ends of the cutters 26 overlap one another, while the junctures 32 are only partially overlapped.

A pair of semicircular blades 34 are located at about the center, longitudinally speaking, of the stripper parts 20. As is best seen in FIG. 2, when the tool is in its closed position, the semicircular blades define a circle which is sized to circumscribe an axially located conductor of a cable. Straight cutter parts 36 are located on opposite sides of the semicircular blades. The cutter parts are of equal longitudinal length and sized such that when the tool is moved from its open to its closed position on the cable, the central conductor will be positioned in the circle defined by the semicircular blades 34 and the balance of the cable will be cut by the straight parts 36 as they are brought into abutment for a nipping as distinguished from a shearing action.

Two pairs of sheath insulation strippers 38, 40 are provided. The sheath insulation strippers are disposed symmetrically on opposite sides of the semicircular cutter parts 34 and the straight parts 36. Further straight parts 42, 44 project outwardly respectively from the stripper pairs 38, 40. The four straight parts each define a cutting edge and the cutting edges are in a common plane.

Each of the stripper pairs includes a pair of V-shaped cutters 46, 48. Each of the V-shaped cutters is oriented such that the wide ends are each connected to one of the straight parts 36, 42, 44. Each of the stripper pairs 38, 34 defines a diamond shaped opening when the tool is in its closed position as is best seen in FIG. 2.

As an examination of FIG. 3 will show the stripping part of each lever has a flat back surface 50 and the back surfaces are in the common plane of the straight parts. The straight cutter parts 36 are each defined by one of the back surfaces 50 and a tapered surface 52 in the stripping part surface visible in FIGS. 1 and 2.

Operation

When a connector is to be secured to a coaxial cable, the tool is first moved to an open position. An end portion of the cable of a desired length is then inserted in the cable cutter 26 and the tool is moved to its closed position to shear off the end portion. As the tool is closed, the blade sections 28, 30 are effective to cam a central cable conductor into the junctures 32 such that the cutters 26 are symmetrically disposed with respect to the cable axis. More importantly, this camming action assures that the actual cutting of the central conductor is at the junctures. By assuring the conductor being at the junctures, nicking of the blades 28, 30 by a steel conductor is avoided. By avoiding such nicking, good long lived shearing action of the two rings of insulation and the sheath which surround the conductor is assured. If the junctures have been dulled to the point that they fail to cut the central conductor, the conductor can easily be trimmed such as with a suitable pair of nippers.

The tool is again moved to its open position and the trimmed cable is moved between the straight cutter parts 36 and the semicircular blades 34. The tool is closed and in doing so, the cutter parts 36 sever the two rings of insulation and the sheath as do the semicircular blades. Once closed, the semicircular blades 34 encircle the conductor. The tool and the cable are now relatively moved axially to strip a surrounding insulation and sheath section that has been severed from the conductor.

The tool is again opened, and the cable is now positioned in alignment with an appropriate one of the sheath insulation stripper pairs 38, 40. As will be seen from an examination of FIG. 2 the stripper pairs are of different sizes and each is sized for a particular standard commercially available cable size.

Once the cable has been positioned appropriately in a selected one of the sheath stripper pairs, the tool is closed to bring the two V-shaped blades into four points of contact about the perimeter of sheath insulation surrounding the sheath. These four points are spaced about the circumference of the sheath insulation and lie in a common plane normal to the cable axis. The tool is moved to its closed position which will bring the V-shaped blades of the selected stripper pair substantially into point contact with the sheath at four spaced locations around the circumference of the sheath. The tool and the cable are then relatively rotated to complete and circumferential cut in the sheath insulation.

The relative rotation is accomplished either by rotating the tool around the cable, or oscillating the tool relative to the cable. Once a circumferential cut in the insulation has been established, the cable and tool are once again moved axially relatively and a severed part of the sheath insulation is stripped.

A selected connector is now placed over the exposed end portion of the conductor and, with at least some standard connectors, over the sheath. The connector is then crimped by opening the tool and positioning the connector in alignment with the appropriate one of the crimping apertures 24 and closing the tool to crimp the connector.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and scope of the invention as hereinafter claimed.

What is claimed is:

1. A cable stripping tool comprising:
   a) a pair of pivotally connected levers relatively moveable between open and closed positions;
   b) each of the levers including a handle portion and a jaw portion disposed on opposite sides of the pivot, the levers also including boss portions connected by the pivot;
   c) the jaw and handle portions each being symmetrical about an imaginary plane normal to an axis of the pivot;
   d) the jaw portions including pairs of mating connector crimping recesses;
   e) the levers also each including a cutter and stripping section between the handle portion and the pivot;
   f) the boss portions having coacting cable severing blades adapted to sever a cable in a shearing action;
   g) the sections including at least two pairs of coacting shield insulation cutting and stripping cutters;
   h) the shield insulation cutters each including a generally V-shaped portion, the V portions being oppositely oriented such that wide ends of the V portions are adjacent and aligned when the levers are in the closed position;
   i) the sections also including a coacting pair of conductor insulation cutting and stripping cutters;
   j) the conductor insulation cutters each including a generally semicircular portion such that the semicircular portions substantially define a circle when the levers are in the closed position;
   k) each of the conductor insulation cutters also including a spaced pair of coacting cutting edges in substantially abutting relationship when the levers are in the closed position, the cutting edges being on opposite sides of the semicircular portions to coact with the semicircular portions in insulation stripping procedures; and
   l) the cutter and stripping sections each being disposed between the severing blades and the handle portions.

2. The tool of claim 1 wherein the conductor insulation cutters are between the at least two shield insulation cutter pairs.

3. The tool of claim 2 wherein there are three pairs of crimping recesses.

4. The tool of claim 1 wherein there are three pairs of crimping recesses.

5. The tool of claim 1 wherein the severing blades are between the insulation cutters and the pivot.

6. The tool of claim 1 wherein each severing blade includes a pair of sections meeting at a junction and at an obtuse angle with respect to one another whereby to cam a conductor into the junctures on movement of the levers to the closing position to sever a cable.

7. A cable stripping tool comprising:
   a) a pair of pivotally connected levers relatively moveable between open and closed positions;
   b) each of the levers including a handle portion and a jaw portion disposed on opposite sides of the pivot, the levers also including boss portions connected by the pivot;
   c) the jaw and handle portions each being symmetrical about an imaginary plane normal to an axis of the pivot;
   d) the jaw portions including pairs of mating connector crimping recesses;
   e) the levers also each including a cutter and stripping section between the handle portion and the pivot;
   f) the boss portions having coacting cable severing blades adapted to sever a cable in a shearing action;
   g) the sections including at least two pairs of coacting shield insulation cutting and stripping cutters;
   h) the shield insulation cutters each including a pair of spaced oppositely tapering cutter parts, the pairs of parts being oppositely oriented such that wide ends of the spaced cutting parts are adjacent and aligned when the levers are in the closed position;
   i) the sections also including a coacting pair of conductor insulation cutting and stripping cutters;
   j) the conductor insulation cutters each including a generally semicircular portion such that the semicircular portions substantially define a circle when the levers are in the closed position;
   k) each of the conductor insulation cutters also including a spaced pair of coacting cutting edges in substantially abutting relationship when the levers are in the closed position, the cutting edges being on opposite sides of the semicircular portions to coact with the semicircular portions in insulation stripping procedures; and
   l) the cutter and stripping sections each being disposed between the serving blades and the handle portions.

8. The tool of claim 7 wherein the conductor insulation cutters are between the shield insulation cutter pairs.

9. The tool of claim 7 wherein the severing blades are between the insulation cutters and the pivot.

10. The tool of claim 7 wherein each severing blade includes a pair of sections meeting at a junction and at an obtuse angle with respect to one another whereby to cam a conductor into the junctures on movement of the levers to the closing position to sever a cable.

* * * * *